(12) United States Patent
Krishna et al.

(10) Patent No.: US 10,282,342 B2
(45) Date of Patent: May 7, 2019

(54) PARALLEL PROCESSING IN SCSI MINIPORT DRIVER OF SINGLE CONTROLLER AND DUAL CONTROLLER STORAGE SYSTEMS

(71) Applicant: Dell Products L.P., Round Rock, TX (US)

(72) Inventors: Vemuri Sai Krishna, Guntur (IN); Anirban Kundu, Kolkata (IN); Naman Jain, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 15/441,041

(22) Filed: Feb. 23, 2017

(65) Prior Publication Data
US 2018/0239736 A1    Aug. 23, 2018

(51) Int. Cl.
G06F 13/42    (2006.01)
G06F 3/06    (2006.01)
G06F 13/10    (2006.01)
G06F 13/24    (2006.01)

(52) U.S. Cl.
CPC .......... *G06F 13/4226* (2013.01); *G06F 3/065* (2013.01); *G06F 3/0619* (2013.01); *G06F 3/0661* (2013.01); *G06F 3/0665* (2013.01); *G06F 3/0689* (2013.01); *G06F 13/102* (2013.01); *G06F 13/24* (2013.01); *G06F 13/423* (2013.01)

(58) Field of Classification Search
CPC .......... G06F 3/06; G06F 3/067; G06F 3/0604
See application file for complete search history.

(56) References Cited

U.S. PATENT DOCUMENTS

| | | | |
|---|---|---|---|
| 6,490,636 B1 | 12/2002 | Kikuchi et al. | |
| 8,762,682 B1 | 6/2014 | Stevens | |
| 2007/0011485 A1* | 1/2007 | Oberlin | G06F 9/5055 714/4.1 |
| 2010/0251073 A1* | 9/2010 | Stolowitz | G06F 3/0617 714/770 |
| 2014/0025770 A1* | 1/2014 | Warfield | G06F 15/17331 709/213 |
| 2014/0185376 A1* | 7/2014 | Sinclair | G11C 16/10 365/185.03 |
| 2017/0315728 A1* | 11/2017 | Zheng | G06F 3/0604 |

* cited by examiner

*Primary Examiner* — Idriss N Alrobaye
*Assistant Examiner* — Getente A Yimer
(74) *Attorney, Agent, or Firm* — Jackson Walker L.L.P.

(57) ABSTRACT

A method includes receiving, by a storage driver associated with a storage controller and a corresponding storage array, a data structure associated with an I/O request from a host, wherein the data structure is indicative of a virtual address. A top layer and a RAID core layer of a RAID miniport driver execute asynchronously to perform preprocessing operations including generating a linked plurality of physical I/O (PIO) data structures in accordance with the virtual address and a RAID configuration of the storage array, and storing a pointer to the linked plurality of PIO data structures. A protocol layer of the RAID miniport driver may then be executed synchronously to transfer, in accordance with the linked plurality of PIO data structures, I/O data corresponding to the I/O request between the storage controller and the storage array. Interrupt operations may then be performed synchronously to indicate completion of the I/O request to the host.

20 Claims, 5 Drawing Sheets

PARALLEL PROCESSING IN SCSI MINIPORT DRIVER OF SINGLE CONTROLLER AND DUAL CONTROLLER STORAGE SYSTEMS

TECHNICAL FIELD

The present disclosure generally relates to data storage systems and in particular to storage systems employing at least one redundant array of independent disks (RAID) volume.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

Windows family operating systems from Microsoft provide two types of storage port drivers—the Small Computer System Interface (SCSI) Port driver and the Storport driver. The SCSI port driver supports a "half-duplex" mode that may be used to implement the driver within a single-core architecture. As is well known, Windows port drivers interact with vendor-provided code, commonly referred to as a miniport or a miniport driver, which can invoke Microsoft-provided services. Miniport drivers for the SCSI port driver use an interrupt lock to synchronize execution of certain Microsoft-provided services including StartIO and Interrupt Service Routine (ISR) services. In contrast, a SCSI port miniport driver can invoke a BuildIO service asynchronously, i.e., without acquiring any lock. The minimum number of clock cycles required to execute two pieces of code asynchronously is lower than the minimum number of clock cycles required to execute synchronously because the asynchronous code can execute in parallel for some or all of the applicable clock cycles, however certain services must execute synchronously to maintain coherency.

SUMMARY

Disclosed subject matter addresses performance issues with certain I/O driver stacks by leveraging asynchronous execution capabilities of certain miniport driver services.

In accordance with one aspect of disclosed subject matter, a method includes receiving, by a storage driver associated with a storage controller and a corresponding storage array, a data structure associated with an I/O request from a host, wherein the data structure is indicative of a virtual address. The storage array may include multiple storage drives and the storage controller may implement the array with a RAID-compliant protocol. In such embodiments, at least some of configuration details of the RAID implementation are addressed in the SCSI port miniport driver and these miniport drivers may be referred to herein as RAID miniport drivers.

A top layer and a RAID core layer of a RAID miniport driver may then be executed asynchronously to perform pre-processing operations. The pre-processing operations may include generating a linked plurality of physical I/O (PIO) data structures in accordance with (a) the virtual address and (b) the RAID configuration of the applicable storage volume. A pointer to the linked plurality of PIO data structures may be stored for subsequent access.

A protocol layer of the RAID miniport driver may then be executed synchronously to transfer, in accordance with the linked plurality of PIO data structures, I/O data corresponding to the I/O request between the storage controller and the storage array. ISR services may then be performed synchronously to complete I/O requests back to the host.

Executing the top layer and RAID core layer of the RAID miniport driver may include entering the top layer and RAID core layer from an asynchronous service suc as a BuildIO service. Executing the protocol layer synchronously may include acquiring an interrupt lock for the storage controller and calling a StartIO routine of the SCSI port miniport driver. The data structure associated with the I/O request may comprise a SCSI request block (SRB) and storing the pointer may include storing the pointer within a predefined address space of SRB, referred to as the SRBextension. Generating the linked plurality of PIO data structures may include generating the linked plurality selectively based on a source of the I/O request. The method may further include maintaining an SRB state indicator in the SRBextension and updating the SRB state indicator when a BuildIO or StartIO is executed. In such embodiments, generating the linked plurality selectively may comprise generating the linked plurality based on the SRB state indicator. In dual-controller embodiments, i.e., embodiments that include two storage controllers, the top layer, RAID core layer, and the protocol layer may be executed via one of two storage controllers and the interrupt operations may be performed via the other of the two storage controllers. In at least one such embodiment, the top layer, RAID core layer, and the protocol layer may be executed by the second-interrupted of the two storage controllers.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

Figure 1:
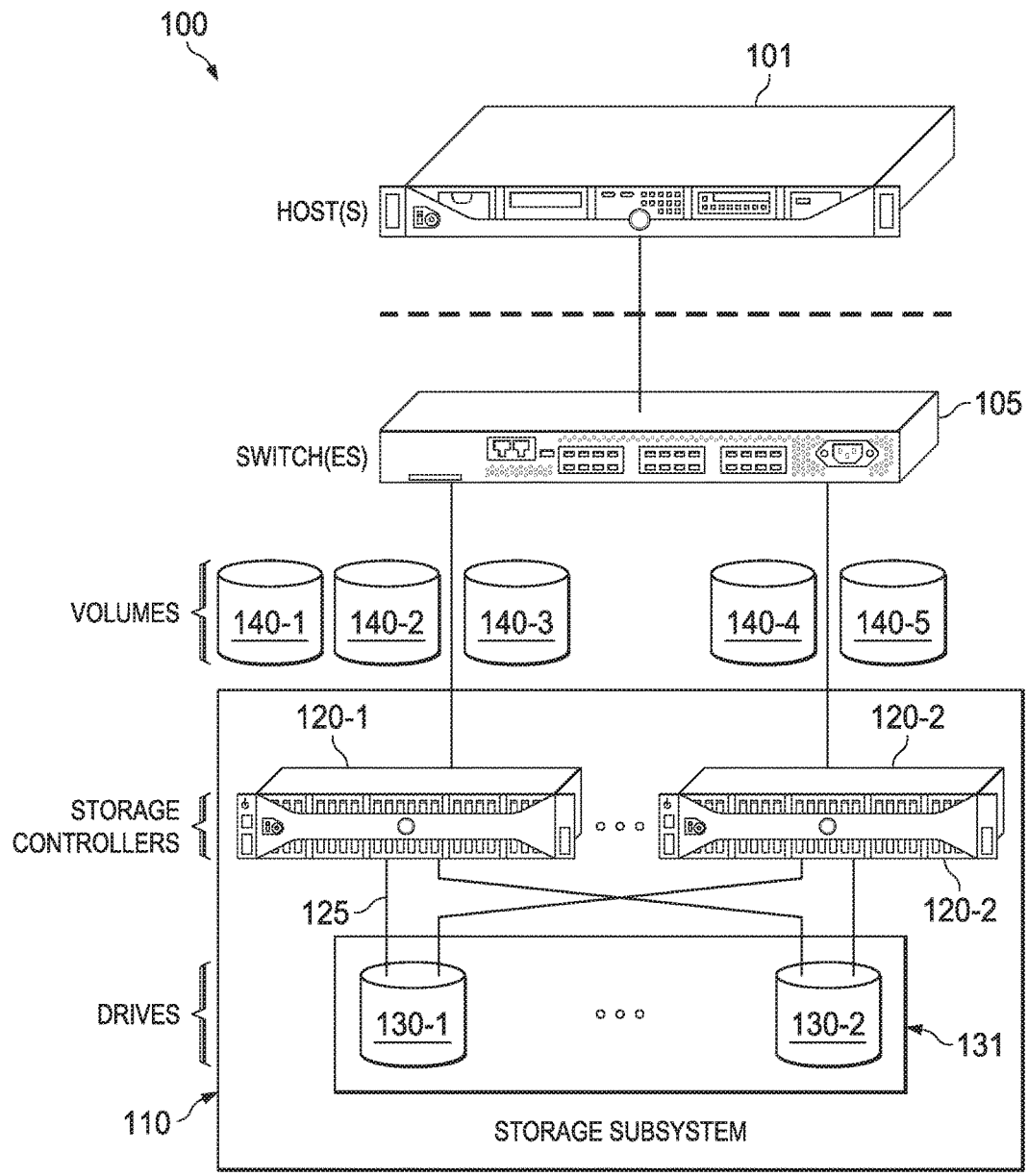
FIG. 1 illustrates an information handling system in accordance with disclosed subject matter.

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

RAID miniport driver architectures may be characterized as having three layers—top, middle, and bottom. The middle layer may also be referred to herein as the RAID core layer and the bottom layer may also be referred to herein as the protocol layer.

The top layer accepts an I/O operation from a host operating system (OS) and passes a request to the RAID core after processing one or more data structures, referred to as SCSI request blocks or SRBs, and building their respective I/O Controls (IOCs). An IOC may identify the target host bus adapter for the corresponding request, indicate a timeout interval and an operation to be performed, and/or return a code for examination by the requesting application.

With respect to a completion path for each request, the top layer receives one or more IOCs from the RAID core and is responsible for mapping received IOCs back to their original SRB. The top layer may also populate SRBs with information needed before completing them to OS.

The RAID core is responsible for implementing the RAID logic, virtual disk caching, and all other features including, as non-limiting examples, handling of degraded I/O operations, parity calculations, striping, creating redundant copies, and other operations that will be familiar to those skilled in the RAID systems.

The RAID core also converts IOCs abstracted at a virtual disk level (logical IOCs) to IOCs abstracted at a physical disk level (physical IOCs) and vice versa and passes the converted IOC up or down the miniport driver stack as applicable.

The Protocol Layer interacts with the storage controller or directly with physical disks. In at least some embodiments, the protocol layer accepts or requires physical IOCs only and converts those physical IOCs to protocol-specific commands in accordance with the protocol observed by the applicable storage controller (e.g., SATA, NVMe, etc.)

At least one embodiment of disclosed subject matter assumes that neither the top layer nor the protocol layer share resources with each other or with the RAID core. With this assumption, each of the three layers can be accessed at the same time, i.e., concurrently.

FIG. 1 illustrates an information handling system 100 configured to manage I/O operations between a host processing resource 101, referred to herein simply as host 101, and a storage subsystem 110 that includes one or more storage controllers 120.

The information handling system 100 illustrated in FIG. 1 includes host 101 coupled to a storage subsystem 110 that includes one or more storage controllers 120. Storage controller(s) 120 are coupled to a plurality of physical storage resources 130 through a storage interconnect 125. Storage controllers 120 may be configured to expose virtualized storage objects, referred to as storage volumes or logical unit number (LUNs) 140 to host 101.

Although FIG. 1 illustrates two storage controllers, first storage controller 120-1 and second storage controller 120-2, within storage subsystem 110, storage subsystem 110 may include a single storage controller.

Each physical storage resource 130 may include one or more hard disk drives, one or more solid state drives, including one or more flash drives, or any combination thereof. The physical storage resources 130 may comprise a storage array 131 comprising two, three, or more drives. In such embodiments, storage controller(s) 120 may implement a RAID protocol and storage array 131 may be implemented as a RAID array.

Figure 2:
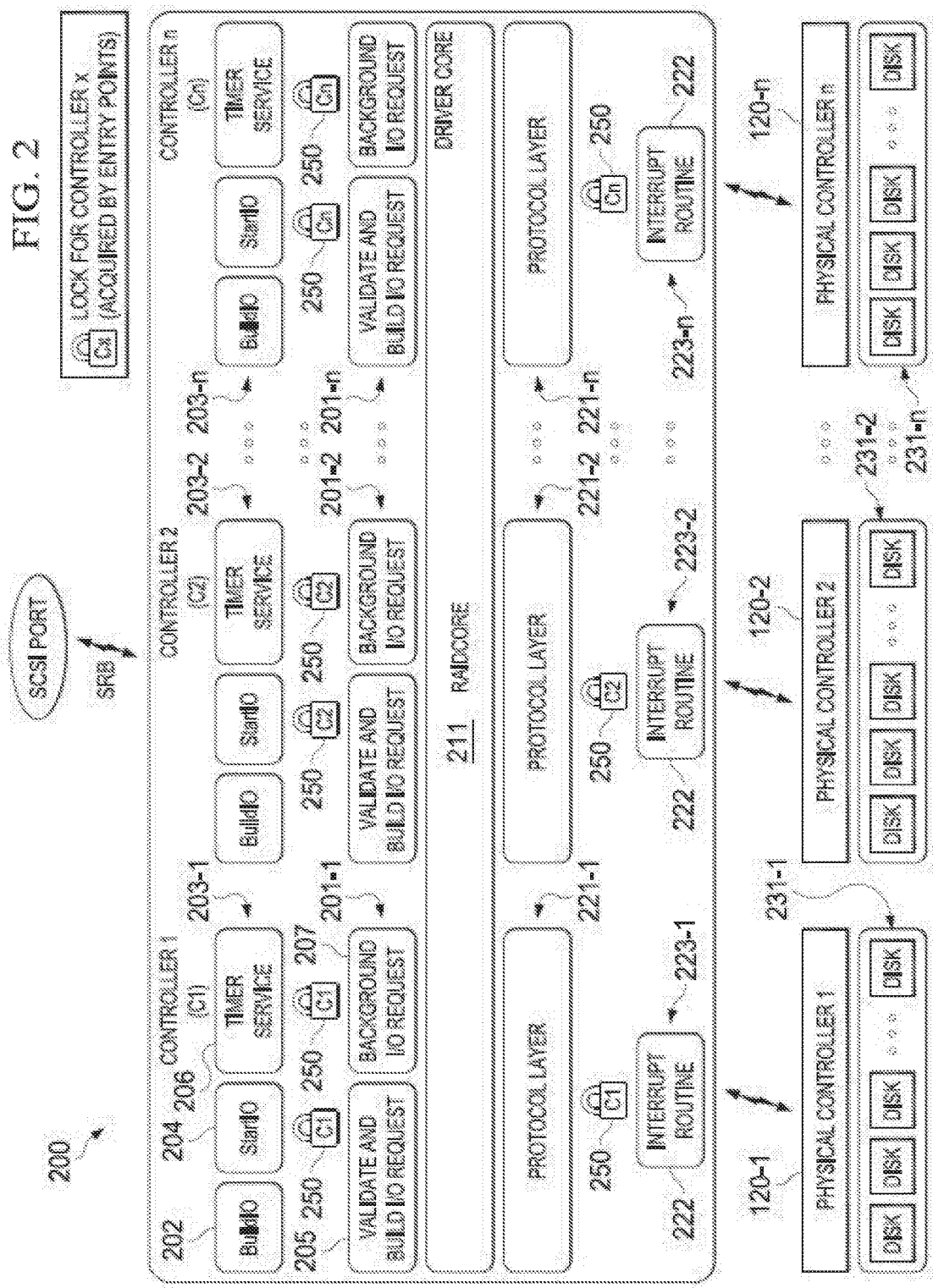
FIG. 2 illustrates a miniport driver architecture.

Referring to FIG. 2, elements of a RAID-compliant SCSI port miniport driver 200, more simply referred to herein as RAID miniport driver 200, suitable for full-duplex or asynchronous operation, abstracting volumes 140 from a RAID-configured storage array 131 are illustrated. The RAID miniport driver 200 illustrated in FIG. 2 includes multiple instances of a top layer 201, a single RAID core layer 211, and multiple instances of a bottom layer or protocol layer 221. As depicted in FIG. 2, RAID miniport driver 200 includes "n" instances of top layer 201 and "n" instances of bottom layer 221, where "n" coincides with the number of storage controllers 120.

Each top layer 201 illustrated in FIG. 2 includes a service 205 for validating and building I/O requests and a background service 207 for performing background tasks. Top layer 201 may accept I/O operations from the host OS and pass them to RAID core layer 211 after processing the applicable SCSI Request Blocks (SRBs) and building their respective I/O containers (IOCs). An IOC is an I/O structure with necessary information for all RAID miniport driver layers. Top layer 201 also receives IOCs from RAID core layer 211 and is responsible for mapping such IOCs back to their original SRBs and populating the SRBs with all necessary information before completing them to the host OS.

RAID core layer 211 may be configured to implement the RAID logic, virtual disk caching, and all ancillary features and functions (degraded I/Os, parity calculations, striping, and creating redundant copies, et cetera). In at least one embodiment, RAID core layer 211 converts logical IOCs to a plurality of physical IOCs that may be delivered to the applicable storage array 231 by the applicable protocol layer 221 and storage controller 120.

The RAID miniport driver 200 illustrated in FIG. 2 also includes "n" instances of top layer entry point services 203 and "n" instances of protocol layer entry point services 223, each of which includes an interrupt service routine (ISR) 222. Each instance of top layer entry point service 203 illustrated in FIG. 2 includes a BuildIO service 202, a StartIO service 204, and a timer service 206 as entries points for the corresponding instance of RAID miniport driver top layer 201.

In the miniport driver 200 illustrated in FIG. 2, the primary routines or entry points for executing RAID core level 211, include BuildIO 202, StartIO 204, timer service 206, and ISR 222.

In a half-duplex implementation, StartIO 204, timer service 206, and ISR 222 are all automatically synchronized per storage controller because, as previously indicated, a storage controller's SCSI port must acquire an interrupt lock before executing any of these services. FIG. 2 illustrates "n" interrupt locks 250, one for each physical storage controller 120.

In half-duplex mode, when StartIO service 204 is executed on a particular device, the execution of timer service 206 and ISR 222 must await completion of StartIO service 204 because the SCSI port will not release interrupt lock 250, which StartIO service 204 necessarily acquired as a prerequisite to execution, until StartIO service 204 completes. Similarly, because acquisition of interrupt lock 250 is a prerequisite to executing timer service 206 and ISR 222, parallel execution of any pair of these three services is prohibited.

Each lock 250 is illustrated in FIG. 2 as comprising three lock ports 250 corresponding to the mutually exclusive entry point services, i.e., the entry point services that must maintain synchronous execution. As illustrated in FIG. 2, the three lock ports 250 correspond to StartIO service 204, timer service 206, and ISR 222 respectively.

RAID miniport drivers virtualize the physical drives connected to the controllers and expose virtual drives created on top of those physical drives as LUNs to the host OS. In general, RAID miniport drivers such as RAID miniport driver 200 are free to expose any LUN, other than a Boot LUN, associated with any first storage controller, e.g., storage controller 120-1, to any of the other storage controllers, e.g., storage controllers 120-2 through 120-n. Conventional half-duplex drivers expose all LUNs through a single storage controller, sometimes referred to as the global device, because their entry points, other than BuildIO 202, require synchronization (only one active at a time) for all LUNs.

Exposing all the LUNs through one controller is consistent with single-threaded behavior. However, single threaded architecture SCSI port miniport drivers cannot leverage a buildIO service to offload preprocessing. Instead, conventional BuildIO services finish I/O's synchronously, which can greatly increase latencies in single threaded architectures.

In at least one embodiment disclosed herein, I/O operations are finished asynchronously and much of the pre-processing is off-loaded to the BuildIO service. Within I/O submission paths, top layer 201 and RAID core layer 211 are executed asynchronously by BuildIO 202 while the protocol layer 221 is executed by StartIO 204. Within completion paths, each layer is executed in Interrupt context.

To store the multiple physical IOCs that need to be submitted to the protocol layer for a single OS SRB, the physical IOCs may be generated as a linked plurality of individual IOCs and the SRB extension space supported by standard miniport drivers may be employed to identify the location of the applicable IOC chain in a manner suggested by the following:

SRB→SRBExtn→IOCHEAD→IOC1→IOC2→IOC3→NULL

In at least one embodiment, StartIO 204 accesses SRB extension, from which the chained IOCs can be submitted to the respective physical disks by the protocol layer. The chaining mechanism may be selective since all I/O operations that access the RAID core layer pass through this trap, including I/O operations that are not intended to be chained including as non-limiting examples, I/Os corresponding to background tasks, cache I/Os, and intermediate I/Os like parity read for R5, etc.

Accordingly, I/Os from the OS, and their intermediate I/Os including parity read, may be chained/trapped selectively because it may be necessary to perform a read modify write that calls the protocol layer multiple times.

An SRB state indicator may be maintained within the SRB extension space or elsewhere to distinguish between SRB that should be trapped and those that should not be. BuildIO 202 may be used to generate the linked plurality of physical IOCs and to determine or access the parity data, after which StartIO may be used to handle the remaining tasks. The SRB state indicator can be updated when a respective BuildIO/StartIO is called/executed. An SRB state extracted from the SRB extension space can be leveraged if a linked SRB can be found.

Figure 3:
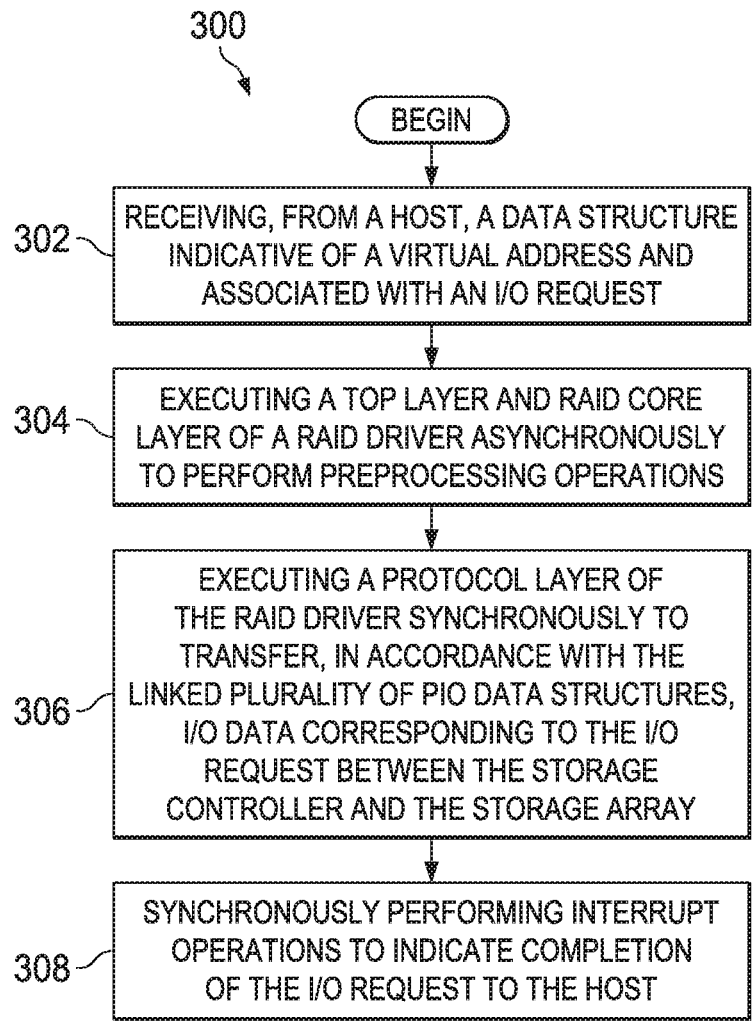
FIG. 3 illustrates a flow diagram of a method for implementing "full-duplex" operation on a single controller system.

FIG. 3 illustrates a flow diagram 300 of a method 300 for implementing a SCSI port miniport driver in accordance with the preceding teachings. In accordance with one aspect of disclosed subject matter, method 300 includes receiving (operation 302), by a storage driver associated with a storage controller and a corresponding storage array, a data structure associated with an I/O request from a host, wherein the data structure is indicative of a virtual address. A top layer and a RAID core layer of a RAID miniport driver may then be executed (operation 304) asynchronously to perform pre-processing operations. The pre-processing operations may include generating a linked plurality of physical I/O (PIO) data structures in accordance with the virtual address and a RAID configuration of the storage array, and storing a pointer to the linked plurality of PIO data structures. A protocol layer of the RAID miniport driver may then be executed (operation 306) synchronously to transfer, in accordance with the linked plurality of PIO data structures, I/O data corresponding to the I/O request between the storage controller and the storage array. Interrupt operations may then be performed (operation 310) synchronously to initiate completion of each I/O request to the host.

Executing the top layer and RAID core layer may include calling the top layer and RAID core layer from a BuildIO routine of the storage driver of a SCSI port miniport driver. Executing the protocol layer synchronously may include acquiring an interrupt lock for the storage controller and calling a StartIO routine of the SCSI port miniport driver. The data structure associated with the I/O request may comprise a SCSI request block (SRB) and storing the pointer may include storing the pointer within an SRBextension space of the SRB. Generating the linked plurality of PIO data structures may include generating the linked plurality selectively based on a source of the I/O request. The method may further include maintaining an SRB state indicator in the SRBextension and updating the SRB state indicator when a BuildIO or StartIO is executed. Generating the linked plurality selectively may comprise generating the linked plurality based on the SRB state indicator.

In embodiments that include two storage controllers, i.e., dual controllers, the top layer, RAID core layer, and the protocol layer may be executed via one of two storage controllers and the interrupt operations may be performed via the other of the two storage controllers. The top layer, RAID core layer and the protocol layer are executed by the second-interrupted of the two storage controllers.

Figure 4A:
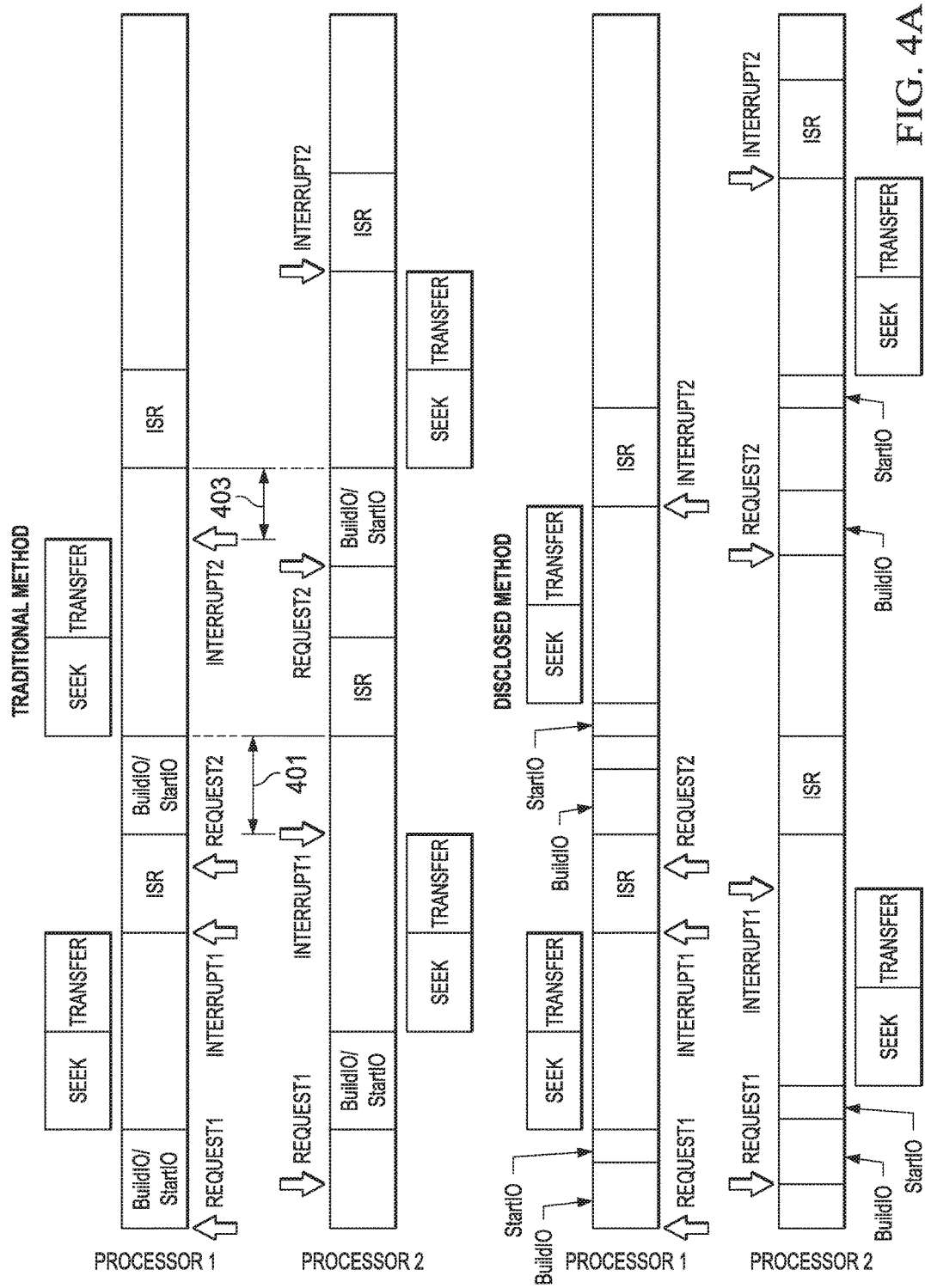
FIG. 4A is a comparative illustration of operations for two SCSI port miniport drivers implemented in a single-controller system.

Performance comparisons between typical half-duplex SCSI port miniport and the proposed method are illustrated in FIG. 4A, wherein each of the signals is generated under the assumptions that there are two processors in the system and that no other device interrupts or service routines consume the processor.

As illustrated by interval 401 in FIG. 4A, the ISR for processor 2, Interrupt 1 waits for a longer duration because it must wait for completion of the ISR for Processor 1, Int1 as well as the completion of processor1 BuildIO/StartIO associated with processor 1 Req2. In the proposed method, the ISR for processor 2 Int1 begins as soon as ISR for processor 1, Int1 ends.

The ISR for processor 1 Int1 is delayed (interval 403) pending completion of the BuildIO/StartIO for processor 2 Req2 in a traditional method, but executes immediately in the proposed method. While StartIO for processor 1, Req2 and processor 2, Req2 are delayed even in the proposed method, the total delay is considerably lower than the waiting times in the traditional method.

Further improvements in performance can be achieved for dual controller boards by leveraging one controller for submission and one controller for completion path. Legacy AHCI controllers share the interrupt line. Devices with shared interrupt lines are interrupted sequentially one by one until any one of them claims the interrupt. For best performance, at least one embodiment takes advantage of the inherent ordering of interrupts by allocating the interrupt handling to the first controller.

Figure 4B:
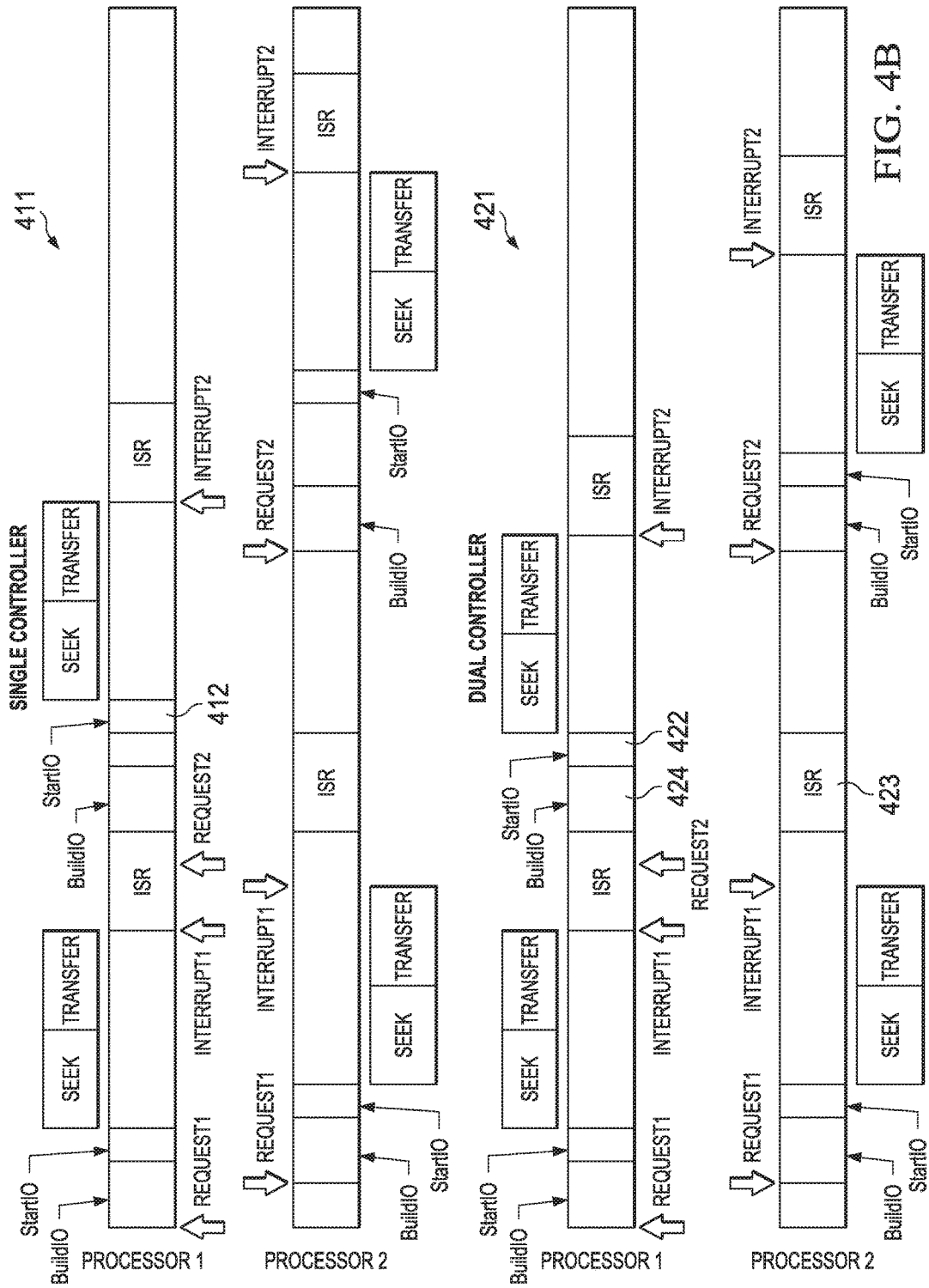
FIG. 4B is a comparative illustration of full-duplex operations of a SCSI port miniport driver for single-controller and dual controller systems.

FIG. 4B illustrates a comparison between the single controller operation (411) and dual controller operation (421). One advantage for dual controller boards is that the ISR and the StartIO service can be executed in parallel, which helps in enhancing performance. For example, whereas the StartIO service 412 associated with Req2 for processor 1 awaits completion of the ISR 413 for Req1/Int1 on processor 2 in the single controller embodiment 411, the StartIO 421 on the second controller executes immediately after the preceding BuildIO 424 completes because StartIO 421 may execute in parallel with ISR 423 in the dual controller embodiment.

Any one or more processes or methods described above, including processes and methods associated with the FIG. 3 flow diagram, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A method, comprising:
   receiving, by a storage driver associated with a storage controller and a corresponding storage array, a data structure associated with an input/output (I/O) request from a host, wherein the data structure is indicative of a virtual address;
   executing a top layer and redundant array of inexpensive disks (RAID) core layer of a RAID miniport driver asynchronously to perform preprocessing operations including: generating a linked plurality of physical I/O (PIO) data structures in accordance with the virtual address and a RAID configuration of the storage array; and
   storing a pointer to the linked plurality of PIO data structures;
   executing a protocol layer of the RAID miniport driver synchronously to transfer, in accordance with the linked plurality of PIO data structures, I/O data corresponding to the I/O request between the storage controller and the storage array; and
   synchronously performing interrupt operations to indicate completion of the I/O request to the host;
   wherein executing the top layer and RAID core driver asynchronously comprises executing the top layer and RAID core driver without acquiring an interrupt lock and wherein executing the protocol layer synchronously comprises acquiring an interrupt lock before executing the protocol layer.

2. The method of claim 1, wherein executing the top layer and RAID core layer comprises calling the top layer and RAID core layer from a BuildIO routine of the storage driver of a small computer systems interface (SCSI) miniport driver.

3. The method of claim 2, wherein executing the protocol layer synchronously includes acquiring an interrupt lock for the storage controller and calling a StartIO routine of the SCSI port miniport driver.

4. The method of claim 1, wherein the data structure associated with the I/O request comprises a SCSI request block (SRB) and wherein storing the pointer comprises storing the pointer within an SRBextension of the SRB.

5. The method of claim 4, wherein generating the linked plurality of PIO data structures comprises generating the linked plurality selectively based on a source of the I/O request.

6. The method of claim 5, further comprising:
   maintaining an SRB state indicator in the SRBextension and updating the SRB state indicator when a BuildIO or StartIO is executed, wherein generating the linked plurality selectively comprises generating the linked plurality based on the SRB state indicator.

7. The method of claim 1, wherein the top layer, RAID core layer, and the protocol layer are executed via one of two storage controllers and wherein the interrupt operations are performed via the other of the two storage controllers.

8. The method of claim 7, wherein the top layer, RAID core layer and the protocol layer are executed by the second-interrupted of the two storage controllers.

9. An information handling system comprising:
   a processor;
   a storage medium including data structures and processor executable instructions that, when executed by the processor, cause operations comprising: receiving, by a storage driver associated with a storage controller and a corresponding storage array, a data structure associated with an input/output (I/O) request from a host, wherein the data structure is indicative of a virtual address;
   executing a top layer and a redundant array of inexpensive disks (RAID) core layer of a RAID miniport driver asynchronously to perform preprocessing operations including: generating a linked plurality of physical I/O (PIO) data structures in accordance with the virtual address and a RAID configuration of the storage array; and
   storing a pointer to the linked plurality of PIO data structures;
   executing a protocol layer of the RAID miniport driver synchronously to transfer, in accordance with the linked plurality of PIO data structures, I/O data corresponding to the I/O request between the storage controller and the storage array; and
   synchronously performing interrupt operations to indicate completion of the I/O request to the host;
   wherein executing the top layer and RAID core driver asynchronously comprises executing the top layer and RAID core driver without acquiring an interrupt lock and wherein executing the protocol layer synchronously comprises acquiring an interrupt lock before executing the protocol layer.

10. The information handling system of claim 9, wherein executing the top layer and RAID core layer comprises calling the top layer and RAID core layer from a BuildIO routine of the storage driver of a small computer system interface (SCSI) miniport driver.

11. The information handling system of claim 9, wherein executing the protocol layer synchronously further includes calling a StartIO routine of the SCSI port miniport driver.

12. The information handling system of claim 9, wherein the data structure associated with the I/O request comprises a SCSI request block (SRB) and wherein storing the pointer comprises storing the pointer within an SRBextension of the SRB.

13. The information handling system of claim 12, wherein generating the linked plurality of PIO data structures comprises generating the linked plurality selectively based on a source of the I/O request.

14. The information handling system of claim 13, wherein the operations include:
   maintaining an SRB state indicator in the SRBextension and updating the SRB state indicator when a BuildIO or StartIO is executed, wherein generating the linked plurality selectively comprises generating the linked plurality based on the SRB state indicator.

15. The information handling system of claim 9, wherein the top layer, RAID core layer, and the protocol layer are executed via one of two storage controllers and wherein the interrupt operations are performed via the other of the two storage controllers.

16. The information handling system of claim 15, wherein the top layer, RAID core layer and the protocol layer are executed by the second-interrupted of the two storage controllers.

17. A non-transitory computer readable medium, comprising processor executable instructions that, when executed by a processor, cause the processor to perform operations comprising:
   receiving, by a storage driver associated with a storage controller and a corresponding storage array, a data structure associated with an input/output (I/O) request from a host, wherein the data structure is indicative of a virtual address;

executing a top layer and RAID core driver asynchronously to perform preprocessing operations including:
generating a linked plurality of physical I/O (PIO) data structures in accordance with the virtual address and a RAID configuration of the storage array; and
storing a pointer to the linked plurality of PIO data structures;

executing a protocol layer of the RAID miniport driver synchronously to transfer, in accordance with the linked plurality of PIO data structures, I/O data corresponding to the I/O request between the storage controller and the storage array; and synchronously performing interrupt operations to indicate completion of the I/O request to the host;

wherein executing the top layer and RAID core driver asynchronously comprises executing the top layer and RAID core driver without acquiring an interrupt lock and wherein executing the protocol layer synchronously comprises acquiring an interrupt lock before executing the protocol layer.

18. The computer readable medium of claim 17, wherein executing the top layer and RAID core layer comprises calling the top layer and RAID core layer from a BuildIO routine of the storage driver of a small computer systems interface (SCSI) miniport driver.

19. The computer readable medium of claim 18, wherein executing the protocol layer synchronously further includes calling a StartIO routine of the SCSI port miniport driver.

20. The computer readable medium of claim 17, wherein the data structure associated with the I/O request comprises a SCSI request block (SRB) and wherein storing the pointer comprises storing the pointer within an SRBextension of the SRB.

* * * * *